United States Patent [19]
Rönnlund

[11] Patent Number: 5,345,678
[45] Date of Patent: Sep. 13, 1994

[54] METHOD OF ASSEMBLING WINDOW AND GLASS-DOOR CASEMENTS

[75] Inventor: Stellan Rönnlund, Sollentuna, Sweden

[73] Assignee: Termofrost AB, Kista, Sweden

[21] Appl. No.: 993,725

[22] Filed: Dec. 18, 1992

[30] Foreign Application Priority Data

Dec. 20, 1991 [SE] Sweden .............................. 9103812-5

[51] Int. Cl.⁵ ............................................. B23P 15/00
[52] U.S. Cl. ............................ 29/847.312; 29/897.31; 403/402
[58] Field of Search ...................... 29/897.312, 897.31, 29/505, 515, 521; 403/402; 52/455

[56] References Cited

U.S. PATENT DOCUMENTS

| | | | |
|---|---|---|---|
| 4,078,288 | 3/1978 | Abramson | 52/455 |
| 4,240,765 | 12/1980 | Offterdinger | 403/402 |
| 4,342,144 | 8/1982 | Doguchi | 29/897.312 |
| 5,018,263 | 5/1991 | Stern | 29/897.312 |
| 5,191,706 | 3/1993 | Cosden | 29/897.312 |
| 5,231,862 | 8/1993 | Ashley | 29/897.312 |

FOREIGN PATENT DOCUMENTS

| | | |
|---|---|---|
| 2113026 | 10/1972 | Fed. Rep. of Germany . |
| 2146570 | 10/1972 | Fed. Rep. of Germany . |
| 2216702 | 10/1973 | Fed. Rep. of Germany . |
| 2354233 | 5/1975 | Fed. Rep. of Germany . |
| 2809925 | 9/1979 | Fed. Rep. of Germany .............. 29/897.312 |
| 2062796 | 12/1979 | Fed. Rep. of Germany .............. 29/897.312 |
| 1551221 | 8/1979 | United Kingdom ........... 29/897.312 |

Primary Examiner—Irene Cuda
Attorney, Agent, or Firm—Nies, Kurz, Bergert & Tamburro

[57] ABSTRACT

A method of assembling window and glass-door casements. The casements are a rectangular frame with four profiled U-shaped and mitered channel sections joined at the corners by flat right angled fasteners. The sections have a slot shaped cavity along and in the bottom channel wall. The flat corner fasteners have two legs, each with a cross-section corresponding to the slot. The inner edges of both legs are notched and the legs of a fastener are inserted into the open ends of the slots at the ends of adjacent sections, and the sections then moved into abutment with one another over the fastener legs. The frame is placed into a press tool which includes, (preferably for each frame corner), a fixed part with two sides at right angles, and a movable part also with two sides at right angles. The latter sides have projections that correlate to the notches in the fastener legs. The movable part of the tool can be moved towards and away from the associated fixed part. Each frame corner is inserted between fixed and movable parts of the press tool. The movable part is moved towards the associated fixed part, whereupon the projections on the movable part and the recesses of the fastener legs will coact with a wall of the frame section disposed there-between, causing the projections to deform the wall of the frame into and locked with the notches in the fastener legs.

8 Claims, 2 Drawing Sheets

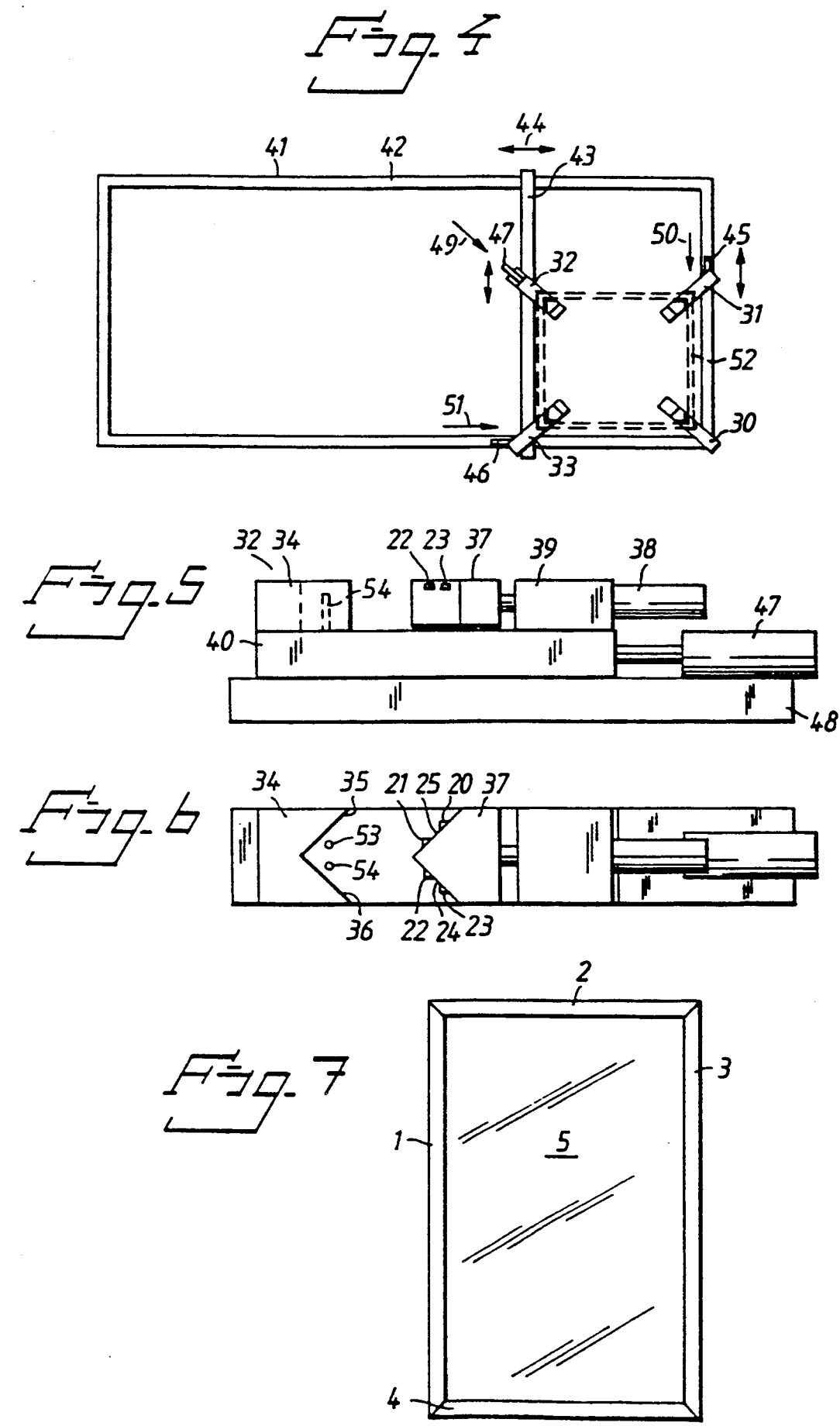

METHOD OF ASSEMBLING WINDOW AND GLASS-DOOR CASEMENTS

The present invention relates to a method of assembling window and glass-door casements, and more particularly to a method of assembling glass-door casements of the kind which are comprised of four aluminium profiled sections that are fitted together to form a rectangular frame which is intended to support one or more glass panes.

The invention relates in particular to the assembly of glass doors which are used to isolate a refrigerated space or freezer space in daily-goods display cabinets from the general shop or store area. Such doors are fitted in an aluminium door frame or casement. When wishing to take a refrigerated or frozen product or article from the display cabinet, the customer opens the door, removes the article from the cabinet and then closes the door. It is obvious that such doors are subjected to very high stresses and strains, due to being frequently opened and closed. The doors are often fitted with triple glazing units comprised of hardened glass, which means that the aluminium frame, i.e. the aluminium door frame, carries a considerable weight.

In the manufacture of present-day door frames or casements of this kind, four straight aluminium profiled sections are fitted on respective sides of, for instance, a double glazing unit, and the frame parts joined together at their respective corners. Joining of the frame parts is effected by placing a special, die-cast corner bracket or fitting into a U-shaped channel provided in the profiled section and screwing the corner fitting firmly in respective sections, normally with the aid of two screws. This method of assembly is expensive, since special corner fittings must be used for each type of profiled sections and because of the considerable manual work involved when assembling the frame sections and tightening the same. When fitting the profiled sections together, it is necessary to take-up tolerances in the lengths of the sections, so as to form clean corners where the sections meet. Furthermore, this method of assembly is encumbered with the drawback that the screws may become loose in time, causing the doorleaf to become unstable and "wobbly".

The present invention relates to a novel method of assembly which can be carried out more simply, more quickly, more cheaply and more securely than earlier known methods intended for the current purpose.

The present invention thus relates to a method of assembling window casements and glass-door casements, and then particularly to a method of assembling glass-door casements which consist of four aluminium profiled sections which are to be fitted together to form a rectangular frame. Each of the profiled sections is provided with a U-shaped channel which extends along its respective section. The four profiled sections are mutually joined at each of the four corners where the sections meet one another and the sections are cut obliquely so as to form mitered corners between respective adjacent sections, wherein single glass panes or multi-glazing units are later fitted to the frame. The invention is characterized in that each of the profiled sections has beneath the floor of the U-shaped channel a slot of generally rectangular cross-section and being fully or partially closed in cross-section; in that there is used a flat fastener device whose cross-sectional shape corresponds to the cross-sectional shape of the slot and which has two limbs (legs) which define a right angle therebetween and which are provided with one or more recesses located on the inner edges of the fastener device; in that the respective limbs of the fastener device are placed in said slot of respective profiled sections and the profiled sections then pushed into abutment with one another to form a frame; in that each of the four corners of the frame is fitted into a press tool, which includes a fixed part having two sides which form right angles with one another and a moveable part having two sides, wherein said sides form essentially a right angle with one another and are provided with projections corresponding to said recesses, wherein said sides are parallel with the first-mentioned two sides; in that the moveable part can be moved towards and away from the fixed part by applying a force between said parts; in that each corner of the frame is fitted between the fixed and the moveable part in respective press tools; and in that the moveable part of the press tool is moved towards the fixed part in a direction which defines an angle of 45° with the longitudinal axis of the two corner-forming profiled sections, such as to cause said recesses to coact with that wall of respective profiled sections which is located between the fastener device and the moveable part of respective press tools and such that each of the press tools will deform said wall in the inner corner of the profiled section with the aid of said projections to an extent such that said wall will essentially conform to the recesses in the fastener device.

The invention will now be described in more detail with reference to an exemplifying embodiment of the invention and also with reference to the accompanying drawings, in which FIG. 1 is a cross-sectional view of a profiled section;

FIG. 4 is a schematic illustration of a framework with press tool;

FIG. 5 is a side view of a press tool;

FIG. 6 illustrates the press tool of FIG. 5 from above; and

FIG. 7 is a schematic illustration of a glass door panel.

Figure 3:
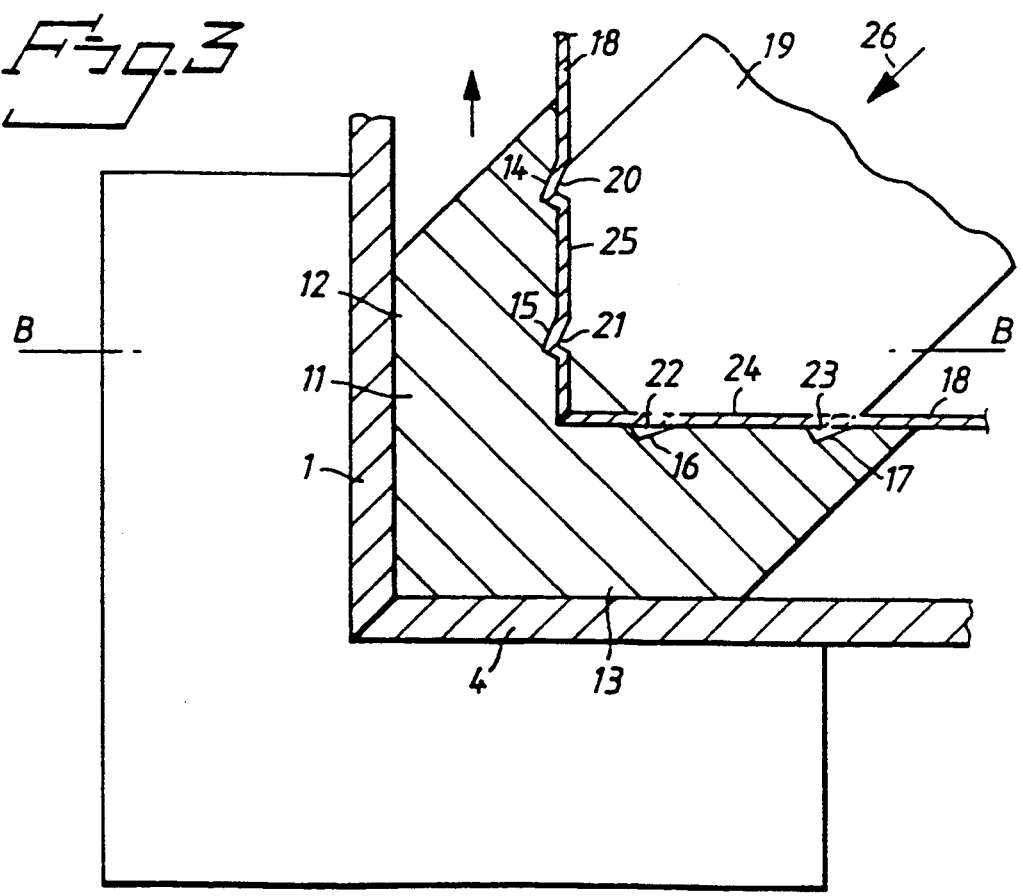
FIG. 3 is a sectioned view taken on the line A—A in FIG. 2.

The present invention relates to a method of assembling window casements and glass-door casements, and particularly to a method of assembling glass-door casements which comprise four aluminium profiled sections 1–4 which are to be fitted together to form a rectangular frame which is intended to support one or more glass panes 5, as shown in FIG. 3.

Such profiled sections 1–4 are provided with a U-shaped channel or channel 6 (see FIG. 1) which extends along the profiled section. The frame is intended to receive the edges of one or more glass panes 5, 7, which are then glued to the profiled sections in the manner indicated in FIG. 1. The embodiment illustrated in FIG. 1 includes a double glazing unit in which the glass panes are distanced from one another with the aid of a so-called spacer 8, in a conventional manner.

When assembling the four profiled sections 1–4, the sections are fastened to one another at each of the four corners where the sections meet. The sections are cut obliquely, so as to form a mitered corner joint between respective sections, see FIG. 7.

Figure 1:
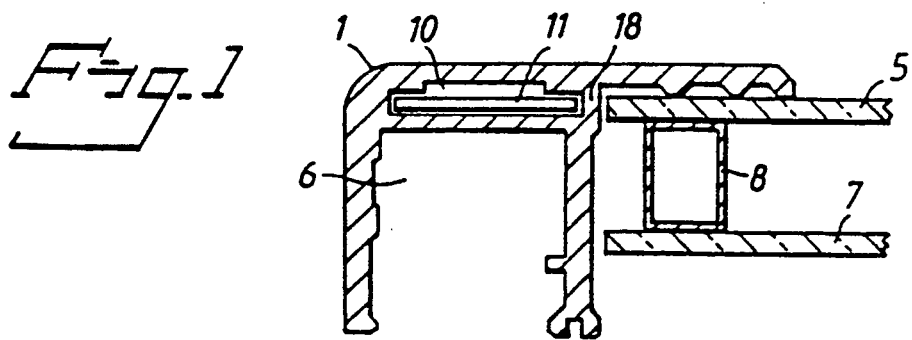
Figure 2:
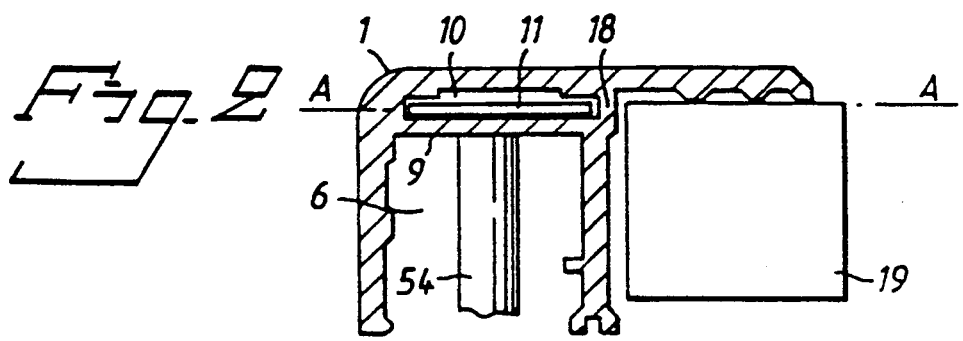
FIG. 2 illustrates an inventive fastener device and part of a press tool in a sectioned view taken on the line B—B in FIG. 3.

In accordance with the invention, a slot 10 of essentially rectangular cross-section is provided beneath the bottom or floor line of the U-shaped channel 6, said slot 10 being either completely closed or partially closed as seen in cross-section. When assembling the profiled sections, there is used a flat fastener device 11 whose cross-sectional shape corresponds generally to the cross-sectional shape of the slot 10, as shown in FIGS. 1 and 2. The fastener device 11 has two limbs (legs) 12, 13 which form a right angle with one another and is also provided with one or more recesses or notches 14–17 in both of the legs, these recesses 14–17 being located on the legs of the inner edges of the legs of the fastener device.

According to the invention, the respective limbs 12, 13 of the fastener device 11 are inserted into the slot 10 of two profiled sections 1, 4 and the sections are then pushed into abutment with one another to form a corner. FIG. 1 shows a fastener device 11 fitted in the slot 10. The recesses 14–17 are then caused to coact with that wall 18 of respective profiled sections which lies against the edge of the fastener device 11 provided said recesses or notches 14–17. This is achieved by causing a press tool 19 having projections 20–23 which correspond in shape to the shape of said recesses 14–17 to deform said wall 18 from outside the profiled section to an extent such that the wall will conform with the shape of the recesses in the fastener device 11.

This will result in a very strong joint between the fastener device 11 and the profiled sections with which the fastener device coacts.

When assembling the casement or frame structure, each of the four corners of the frame are inserted into a press tool 30–33. Each of the press tools 30–33 includes a fixed part 34 having two sides 35, 36 which define a right angle therebetween, and a moveable part 37 which has two sides 24, 25. These two sides define essentially a right angle therebetween and each side 24, 25 is provided with projections 20–23 which correspond in shape to the recesses 14–17. The sides 24, 25 are parallel with the two sides 35, 36 of the fixed part.

The moveable part 37 can be moved towards and away from the fixed part 34, by applying a force between said parts. This force is generated by a hydraulic piston-cylinder device 38 which is mounted in a mounting 39, which in turn is mounted on a plate 40 which is common to the moveable part and the fixed part. This causes a force to be applied between the fixed and the moveable part, and hence in this regard each press tool is a closed unit from a force aspect.

Each corner of the casement frame 52 is placed between the fixed and the moveable part of a respective press tool, as illustrated in FIG. 4 in which a frame 52 is shown in broken lines. The moveable part 37 of the press tool is then moved against the fixed part 34 in a direction which extends at an angle of 45° to the longitudinal axes of the two profiled corner-forming sections which form a corner. When the moveable part comes into abutment with the wall 18 of a respective profiled section, the recesses 14–17 are caused to coact with said wall 18 such that the moveable part of each of the press tools 30–33 will deform said wall 18 of the inner corners of the profiled sections by means of said projections, to an extent such that the wall will conform essentially to the shape of the recesses in the fastener device.

Since each press tool is a closed unit from a force aspect, as previously mentioned, the profiled sections will not tend to part from one another in a corner against which the moveable part of the press tool acts.

According to one preferred embodiment of the invention, the press tools 30–33 are carried by a framework 41. The framework includes a rectangular tool frame 42 comprised of bars and a beam 43 which can be moved parallel with the rectangular tool frame 42. The moveable beam 43 is displaced in the directions of arrows 44 by means of drivers not shown. Two of the press tools 30, 31 are attached to the rectangular tool frame 42 and two of the press tools 32, 33 are attached to the moveable beam 43.

Preferably, one of the press tools 30 is not moveably mounted on the rectangular tool frame. This tool will thus form a zero point. The remaining press tools 31–33, on the other hand, are mounted for movement in relation to the tool frame 42 and the beam 43 respectively.

The fact that the moveable press tools can be moved in relation to the framework enables profiled casement frames of different rectangular shapes to be fitted into the press tools.

According to one important embodiment of the invention, a force is applied to the fixed part 34 of the press tools by means of a force-generating device in relation to the framework, this force being directed on the outer side of a profiled frame inserted in the press tools prior to moving the moveable part of the press tools into abutment with the fixed part thereof in order to carry out a pressing operation. FIG. 4 shows a profiled frame 52 inserted in the press tools in broken lines.

One essential characterizing feature of the inventive method is that the profiled sections are pressed into hard abutment at the corners of the casement frame by the applied force, prior to carrying out the actual pressing operation. This enables length tolerances in the profiled sections to be taken up, so that the casement frame will always obtain clean corners at which the profiled sections are pressed tightly together. These tolerances are typically about +/−0.5 mm.

The aforesaid force is exerted by means of a compressed-air piston-cylinder device 45–47 for each of the moveable press tools. FIG. 5 illustrates a press tool, referenced 32. The press tool 32 is moveably mounted on a plate 48 onto which the piston-cylinder device 47 is mounted. It is this plate 48 of the three moveable press tools 31–33 which, in turn, is moveable in relation to the bar 43 and the tool frame 42 respectively. Thus, the press tool can be moved to a limited extent in relation to respective plates 48 by means of respective compressed-air piston-cylinder devices 45–47. The remaining two moveable press tools are constructed in a corresponding manner.

Thus, according to one important embodiment of the invention, the press tools 30 are fixedly mounted in relation to the framework. In this way, the press tool 32 arranged diagonally to the framework is caused to exert said force 49 diagonally towards the fixed press tool 30, whereas the two remaining press tools 31, 33 are each caused to exert said force, referenced 50, 51, in a direction towards the fixed press tool 30. Consequently, the profiled sections will firmly abut one another at the corners of the casement frame prior to the actual press operation, in that the moveable part 37 of the press tools is moved against the fixed part 34 of the press tools by means of the hydraulic piston-cylinder device 38.

According to one preferred embodiment of the invention, two or more pins 53, 54 project out parallel with the right-angled sides 35, 36 of the fixed part and at a predetermined distance therefrom. The pins 53, 54 have a vertical extension or height such that when a profiled section is fitted into the press tool, the pins will rest on the bottom of the U-shaped channel or channel, see FIG. 2, with the fastener device 11 lying in the same plane as the projections 20-23 of the moveable part 37 of the press tool. In this way, it is always ensured that the profiled sections will be correctly positioned vertically in relation to the projections of the moveable part of the press tool.

For the sake of illustration, FIG. 3 illustrates the wall 18 of the vertical profiled section 1 when deformed by the projections of the press tool, whereas the wall 18 of the horizontal profiled section 4 is not shown to be deformed, although it will be understood that it should have been deformed. The part of the wall which should have been deformed is shown in broken lines.

The press tool is made of steel, suitably a hard tool steel. The profiled sections are extruded aluminum sections. The tool will therefore only be subjected to moderate wear. If so desired, the tool surfaces can be coated with a layer of cemented carbide or hard metal. The fastener device is preferably made of aluminium, although it may also be made of a steel material.

The fastener device is conveniently manufactured by punching the device from metal plate having a thickness of about 2-3 millimeters, for instance.

According to one preferred embodiment of the invention, the recesses 14-17 in the fastener device have a depth which corresponds to the thickness of the wall 18. Although the number of recesses may be varied, it is preferred that two recesses are provided in each limb.

According to another preferred embodiment of the invention, the length of the fastener device in the longitudinal direction of the profiled sections is about from two to five times the width of the slot 10. This will provide sufficiently high precision with regard to the mutual angle defined between adjacent profiled sections, this angle being a right angle at the frame corners.

it will be understood, however, that the present invention can be applied equally as well in cases where the corner angle of two profiled sections to be joined together is other than a right angle and the profiled sections define another angle therebetween.

In this case, the fastener device and respective press tools will be constructed accordingly, of course.

It will also be understood that the present invention can be applied with profiled sections whose cross-sectional shape is different to that shown in FIG. 1.

The present invention shall not therefore be considered limited to the aforedescribed and illustrated exemplifying embodiments thereof, since modifications and variations can be made within the scope of the following claims.

I claim:

1. A method of assembling window and glass-door casements, such as casements of the kind which comprise four aluminium profiled sections, made from aluminium assembled to form a rectangular frame, each section is shaped with a U-shaped channel along the profiled section, the four profiled sections being joined together at each of the four corners where the sections meet, the ends of the profiled sections being cut obliquely so as to form mitered corners where they join, and wherein one or more glass panes are later fitted to the frame; the method comprising: providing for each of the profiled sections within the bottom of the U-shaped channel with a slot of essentially flat rectangular cross-section which is essentially closed in cross-section; providing for each corner of the casement frame a flat right-angled fastener device having two legs whose cross-sectional shape corresponds generally to the cross-sectional shape of said slot; shaping the inner edges of each leg of each fastener device with at least one notch; inserting the legs of said fastener device individually into a slot of respective adjacent profiled sections; moving said adjacent profiled sections into abutment with one another over the inserted fastener legs to form a preassembled rectangular casement frame; fitting each of the four corners of the preassembled frame into a press tool means having at least one tool which include a fixed part having two abutment sides which form a right angle with one another, and a movable part having a second set of two abutment sides which form essentially a right angle with one another; further steps of said method comprising: making, on said second set of two abutment sides, projections which correspond to said notches; said second set of right angled abutment sides being parallel with the first-mentioned set of two abutment sides; the movable part of a tool being constructed so that it is movable towards and away from the associated fixed part of the tool in response to a relative force applied between said fixed and movable parts; when fitting said casement frame in said press tool means, placing a corner of the preassembled casement frame between spaced apart fixed and movable parts of a respective associated tool; forcing the movable part of said associated tool towards the fixed part of said tool in a direction which extends at an angle of 45 to the longitudinal axes of the associated two corner-forming profiled sections, with the inner walls of the two associated corner forming profiled sections located between the inner edges of the legs of the inserted fastener device and the second set of angled abutment sides of the movable part of the associated tool; and forcing the projections on the sides of the movable part of the associated tool to engage and deform said inner walls at the inside of the corners of the preassembled profiled section to an extent such that said wall will essentially be deformed and brought into conformity and locked with the notches in the edges of the legs of the associated fastener device.

2. A method according to claim 1, wherein the tool means has a framework; and including the steps of transferring a force applied by means of a force-generating device from the fixed part of a press tool to the framework and directing the force thus generated onto the outside of a casement frame inserted in the press tool means; and thereby causing the movable part of the tools to move towards the fixed part.

3. A method according to claim 2, wherein a plurality of four tools are provided in the tool means and a first one of the tools is fixedly mounted in relation to the tool means framework; arranging a second of said tools, diagonally to first tool in the tool means framework, and causing a force to be exerted on the casement frame in a diagonal direction towards the first fixedly mounted tool; and providing that the third and fourth remaining tools are each caused to exert their forces in a direction directed towards the first fixed tool.

4. A method according to claim 3, including mounting the second, third and fourth non-stationary tools on the tool means framework for movement relative to the framework so that preassembled casement frames of different rectangular shape can be fitted in the press tool means.

5. A method according to claim 1, further comprising making the fastener devices from aluminium.

6. A method according to claim 1, further comprising making the notches, in the edges of the fastener devices, a depth which corresponds to the thickness of the adjacent channel wall of a profiled section; and providing each of said fastener legs with at least two of said notches.

7. A method according to claim 1, further providing the length dimension of each of the fastener device legs to be within the range of two to five times the width of said slot in the bottom of a profile section channel.

8. A method according to claim 1, further providing jig support pins which project from between and parallel with the right angled sides of the fixed part of a tool at a predetermined distance from said right angled sides, and making said pins with a height such that when a preassembled profile section corner is fitted in the tool with the channel inverted, the pins will rest on the bottom of the U-shaped profiled section channel, thereby causing the flat fastener device in the preassembled casement frame corner to lie in the same plane as the projections of the movable part of the tool.

* * * * *